United States Patent
Gopathy et al.

(10) Patent No.: US 12,143,418 B2
(45) Date of Patent: Nov. 12, 2024

(54) TECHNIQUES FOR PREVENTING MESSAGING ATTACKS IN CODES

(71) Applicant: Cisco Technology, Inc., San Jose, CA (US)

(72) Inventors: Suresh Gopathy, Bangalore (IN); Gajendar Pandey, Delhi (IN); Pradyumna Paralikar, Bhopal (IN)

(73) Assignee: Cisco Technology, Inc., San Jose, CA (US)

( * ) Notice: Subject to any disclaimer, the term of this patent is extended or adjusted under 35 U.S.C. 154(b) by 212 days.

(21) Appl. No.: 17/203,228

(22) Filed: Mar. 16, 2021

(65) Prior Publication Data

US 2022/0303308 A1    Sep. 22, 2022

(51) Int. Cl.
*H04L 51/08*    (2022.01)
*G06K 19/06*    (2006.01)
*H04L 9/40*    (2022.01)

(52) U.S. Cl.
CPC .... *H04L 63/1466* (2013.01); *G06K 19/06037* (2013.01); *H04L 51/08* (2013.01)

(58) Field of Classification Search
CPC ... H04L 63/1466; H04L 51/08; H04L 51/212; H04L 63/1408; H04L 63/0281; G06K 19/06037

See application file for complete search history.

(56) References Cited

U.S. PATENT DOCUMENTS

| | | | | |
|---|---|---|---|---|
| 8,296,477 | B1* | 10/2012 | Polk | G06Q 99/00 710/16 |
| 8,984,640 | B1* | 3/2015 | Emigh | H04L 51/212 726/13 |
| 10,686,826 | B1* | 6/2020 | Goutal | G06F 18/2323 |
| 10,880,322 | B1* | 12/2020 | Jakobsson | H04L 51/08 |
| 2011/0258326 | A1* | 10/2011 | Hu | H04L 63/08 726/3 |
| 2012/0181330 | A1 | 7/2012 | Kim | |
| 2013/0018726 | A1 | 1/2013 | Ionescu et al. | |
| 2014/0110468 | A1* | 4/2014 | Kandregula | G06F 16/9566 235/375 |

(Continued)

OTHER PUBLICATIONS

Gil Friedrich, "URL Defense Link Rewrites: The Good, the Bad, and the Over-Promised", retrieved at <<avanan.com>>, Date of Publication Mar. 2, 2018, 6 Pages.

*Primary Examiner* — Farid Homayounmehr
*Assistant Examiner* — Mudasiru K Olaegbe
(74) *Attorney, Agent, or Firm* — Lee & Hayes, P.C.

(57) ABSTRACT

This disclosure describes techniques for preventing network attacks within messages. For instance, electronic device(s) may receive a message, such as an email, from a first electronic device. The message may include a first code with a first embedded address to a first network resource, such as a malicious network resource. As such, the electronic device(s) may analyze the message to identify the first code. The electronic device(s) may then generate a second address associated with a second network resource, such as a secure proxy, a remote browser, a click-time protection service, and/or the like. Next, the electronic device(s) may embed the second address in a second code and replace the first code within the message with the second code. After replacing the first code, the electronic device(s) may send the message to a second electronic device of the second user.

20 Claims, 7 Drawing Sheets

(56) References Cited

U.S. PATENT DOCUMENTS

| | | | |
|---|---|---|---|
| 2014/0112551 A1* | 4/2014 | Terwilliger | G06K 7/0004 |
| | | | 235/375 |
| 2014/0259158 A1 | 9/2014 | Brown et al. | |
| 2017/0103674 A1* | 4/2017 | Sadeh-Koniecpol | ......... |
| | | | G06F 21/566 |
| 2018/0183820 A1 | 6/2018 | Iyer et al. | |
| 2018/0227324 A1* | 8/2018 | Chambers | H04W 12/128 |
| 2020/0053111 A1* | 2/2020 | Jakobsson | H04L 63/1416 |
| 2020/0153842 A1* | 5/2020 | Anthony | H04L 63/145 |

\* cited by examiner

TECHNIQUES FOR PREVENTING MESSAGING ATTACKS IN CODES

TECHNICAL FIELD

The present disclosure relates generally to preventing network attacks within electronic messages.

BACKGROUND

There are many different types of attacks that may be attempted through the use electronic messages, such as emails. For a first example, phishing is the act of attempting to acquire information from users, such as usernames, passwords, or payment information, by acting as a trustworthy entity in a message. For a second example, malware, which includes software intentionally designed to cause damage to an electronic device, may be sent to the electronic device using a message. In many circumstances, these attacks are performed using uniform resource locators (URLs) that are included within the messages. For instance, a malicious URL may be embedded in a code, such as a Quick Response (QR) code, that is included in a message. As such, the attack associated with the malicious URL may occur when the user attempts to use the code.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

Figure 1:
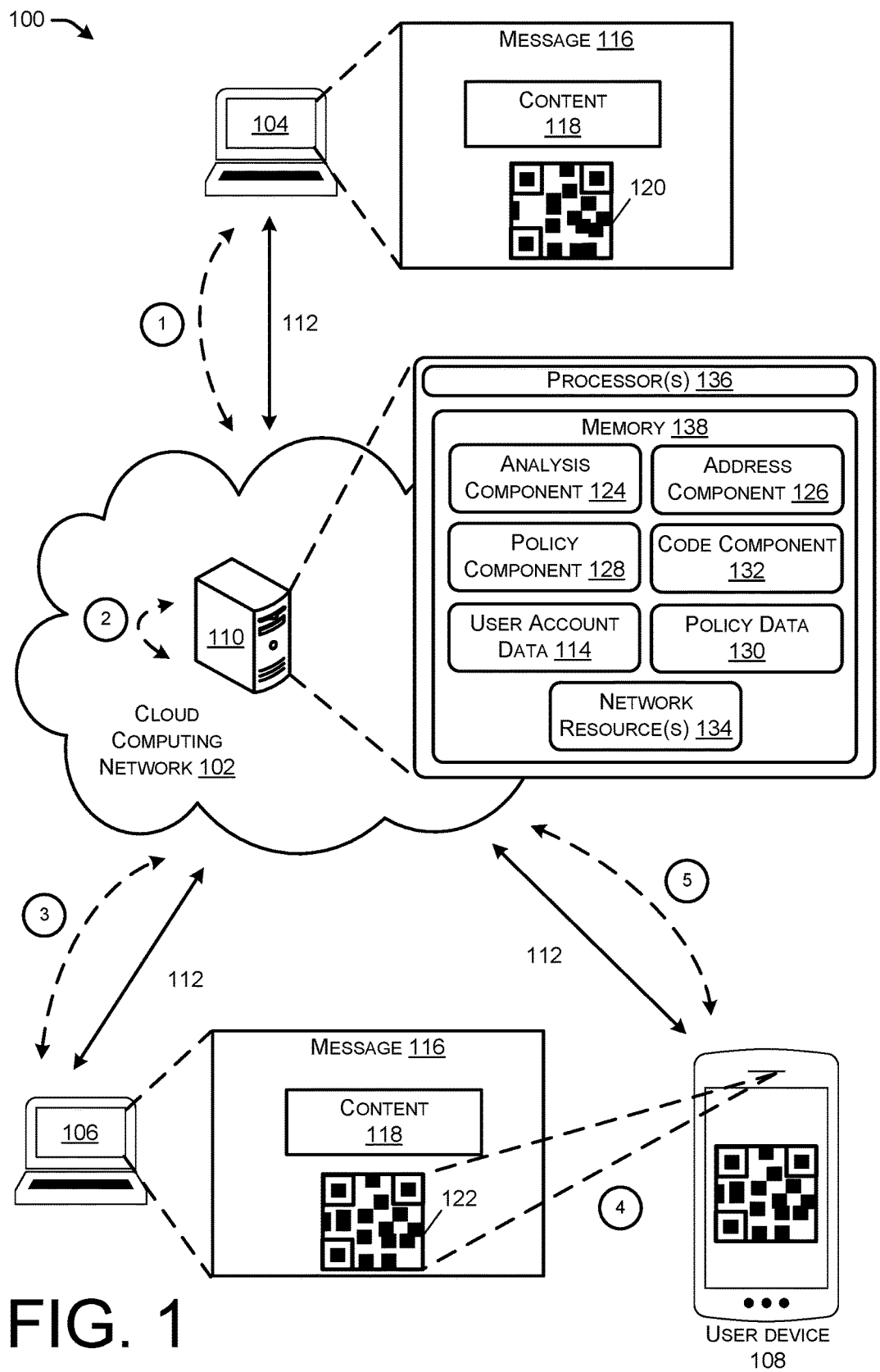
FIG. 1 illustrates a component diagram with an example environment in which attacks may be prevented, in accordance with the present concepts.

This disclosure describes, at least in part, a system that is configured to receive a message from a first electronic device, analyze the message in order to identify a first code included in the message, and then determine that a first address is embedded in the first code, the first address being associated with a first network resource. The system is also configured to generate a second address that is associated with a second network resource and generate a second code, the second address being embedded in the second code. Furthermore, the system is configured to cause the first code within the message to be replaced with the second code and then send the message, that includes the second code, to a second electronic device.

This disclosure also describes, at least in part, a method that includes receiving a message from a first electronic device, identifying a first code included in the message, and determining that a first address is represented by the first code, the first address being associated with a first network resource. The method also includes generating a second address that is associated with a second network resource and generating a second code that represents the second address. Furthermore, the method includes causing the first code within the message to be replaced with the second code and sending the message, that includes the second code, to a second electronic device.

This disclosure further describes, at least in part, one or more computing devices that are configured to receive a message associated with a first electronic device and determine that a portion of the message includes a first code with a first embedded address. The one or more computing devices are also configured to cause the first code to be removed from the message. Furthermore, the one or more computing devices are configured to generate a second code with a second embedded address, cause the second code to be included in the portion of the message, and then send the message, with the second code, to a second electronic device.

Example Embodiments

This disclosure describes, at least in part, techniques for preventing network attacks within electronic messages. For instance, a first user may use a first user device to send a message, such as an email, to a second user. The email may include both content and a first code with a first embedded address associated with a first network resource, such as a suspicious and/or malicious network resource. Electronic device(s) may receive the message from the first user device and analyze the message to identify the first code. In some examples, the electronic device(s) may then determine that the first address embedded within the first code is to the suspicious and/or malicious network resource. As such, the electronic device(s) may generate a second code associated with a second network resource, such as a secure proxy, a remote browser, a click-time protection service, and/or the like. The electronic device(s) may then embed the second address in a second code and replace the first code within the message with the second code. After replacing the first code, the electronic device(s) may send the message to a second user device of the second user. This way, if the second user selects the second code from the message, the second user is taken to the second network resource, which is a secure network resource, instead of the first network resource.

For more details, the first user device may receive inputs for creating the message. As described herein, the message may include, but is not limited to, an email, a text message, a social media message, a video message, web (HTML) page, and/or any other type of message. The message may include at least contact information associated with the sender (e.g., an email address of the first user), contact information associated with the receiver (e.g., an email address of the second user), content, an attachment, and/or the first code with the first embedded address. As described herein, a code may include, but is not limited to, a Quick Response (QR) code, a barcode, and/or any other type of code for which an address may be embedded. Additionally, as described herein, an address may include a uniform resource locator (URL), an identifier, a tracker, a link, and/or the like that points to a network resource.

The first user may attempt to use the first network resource to perform an attack on the second user. For a first example, the first network resource may be associated with a phishing attack, where the first network resource requests personal information from the second user. In order to trick the second user, the first network resource is designed to look like it was sent from a trustworthy source in order to get the second user to input the personal information. For a second example, the first network resource may be designed to install malware on a device, where the malware is intentionally designed to cause damage to and/or steal information from the device. In some examples, the first code is included in a body of the message while in other examples, the first code may be included in an attachment of the message.

The electronic device(s) may receive the message from the first user device. Based on receiving the message, the electronic device(s) may analyze the message, including any attachment(s) included within the message, in order to identify the first code. For example, the electronic device(s) may use one or more computer vision and/or image analysis technique in order to identify the first code, such as the first QR code, within the message. In response to identifying the first code, the electronic device(s) may then extract the first address from the first code. The electronic device(s) may then perform one or more techniques to determine whether to replace the first code within the message before sending the message to the second user.

For example, the electronic device(s) may analyze the first address using one or more techniques to determine if the first address is a good address, a suspicious address, a malicious address, phishing address and/or any other type of address. In some examples, the electronic device(s) may analyze the first address using a reputation check, static & dynamic analysis and/or any other techniques to determine the type of address. For example, the electronic device(s) may compare the first address to a database of malicious address (e.g., a database of malicious URLs) to determine if the first address includes one of the malicious addresses included in the database. If the electronic device(s) determine that the first address is one of the malicious addresses, then the electronic device(s) may determine that the first address includes a malicious address.

Additionally, or alternatively, in some examples, the electronic device(s) may determine a risk score associated with the first address and then use the risk score to determine the type of address. For example, the electronic device(s) may use information about the message and/or the first address to determine the score. The information may include, but is not limited to, a date/time the message was sent, the contact information associated with the sender, the contact information associated with the receiver, a number of recipients that are receiving the message, whether the message was routed through a known service provider, a format of the message and/or data included in the message, a destination of the first address, a geolocation of where the first address originated, and/or any other information. Using the score, the electronic device(s) may then determine a type of first address. For example, the electronic device(s) may determine that the first address is a good address when the score falls within a first range, the first address is a suspicious address when the score falls within a second range, the first address is a malicious address when the score falls when a third range, and/or so forth.

Furthermore, in some examples, the electronic device(s) may store data representing one or more policies associated with replacing codes within messages. A policy may indicate to replace all codes within messages, replace codes within messages that include specific types of addresses (e.g., suspicious addresses, malicious addresses, etc.), replace codes within messages that are directed to specific users (e.g., to manager of a business, to specific email accounts, etc.), replace codes within messages that include addresses associated with specific types of network resource (e.g., sports websites, gambling websites, etc.), replace codes within messages that are sent from specific users (e.g., sent from specific email accounts), replace codes within messages that are directed to types of devices (e.g., computer, mobile phone, servers, etc.), replace codes within messages that are sent from types of devices, and/or any other policy. In some examples, the electronic device(s) receive the data representing the one or more policies from a device. For example, a user may use the device to create the one or more policies for messages.

The electronic device(s) may then use the one or more policies to determine whether to replace the first code within the message. For a first example, the electronic device(s) may analyze the first address in order to determine whether the first address includes a good address, a suspicious address, a malicious address, and/or the like. If a policy indicates to replace codes within messages that includes suspicious addresses or malicious addresses, then the electronic device(s) may determine to replace the first code within the message if the first address includes the suspicious address or the malicious address. For a second example, the electronic device(s) may analyze the message in order to determine that the message is directed to the second user (e.g., directed to contact information associated with the second user). If a policy indicates to replace codes within messages that are directed to the second user, then the electronic device(s) may again determine to replace the first code within the message.

To replace the first code, the electronic device(s) may generate the second address that is associated with the second network resource. As described above, the second network resource may include a secure proxy, a remote browser, a click-time protection service, and/or other type of secure resource. The electronic device(s) may then use the second address to generate the second code, such as a second QR code, where the second address is embedded within the second code. After generating the second code, the electronic device(s) may replace the first code within the message with the second code. In some examples, the electronic device(s) perform the replacement using one or more characteristics associated with the first code. As described herein, a characteristic may include, but is not limited to, a position, a size, an orientation, a color, a shading, and/or any other type of characteristic.

For a first example, the electronic device(s) may analyze the message to determine a position of the first code within the message (and/or an attachment of the message). The electronic device(s) may then replace the first code within the message by inserting the second code at the same position within the message (and/or the attachment of the message). For a second example, the electronic device(s) may analyze the message in order to a size associated with the first code. The electronic device(s) may then replace the first code within the message by causing the second code to include the same size when inserting the second code within the message. Still, and for a third example, the electronic device(s) may analyze the message to determine both the position and the size of the first code. The electronic device(s) may then replace the first code within the message by inserting the second code at the position and with the same size.

The electronic device(s) may then send, to the second user device, the message that includes the second code. After receiving the message, the second user device may display at least the second code from the message. The second user (and/or another user) may then use a third user device to capture an image of the second code. In response, the third user device may use the second address embedded in the second code to access the second network resource. In some examples, the second network resource may provide details about the first network resource so that the second user may make an informed decision about whether to proceed to the first network resource. For example, the second network resource may provide details indicating that the first resource was suspicious or malicious. If the second user decides to proceed to access the first network resource, then the third user device may be redirected to the first network resource.

It should be noted that, while the examples above describe the first user using the first user device to generate the message that includes the first code, in other examples, the first user may use the first user device to generate the message, but a third user using a fourth user device may maliciously add the first code to the message. For example, the fourth user device may intercept the message and then add the first code to the message before the electronic device(s) receive the message. In such scenarios, the electronic device(s) are still able to perform the processes described above in order to replace the first code within the message with the second code before the second user device finally receives the message.

By performing the processes described herein, the electronic device(s) are able to prevent users from experiencing malicious attacks, such as malware and phishing attacks, within messages. The electronic device(s) are able to prevent such malicious attacks even when the addresses associated with the malicious attacks are embedded within codes, such as QR codes. Additionally, by performing the processes described herein, the electronic device(s) are able to still provide the users with the original messages (e.g., the content is the same, but the codes are different) and then allow the users to proceed with accessing the first network resources after providing warnings and/or information about the potential threats associated with the first network resources.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a component diagram with an example environment 100 in which attacks may be prevented, in accordance with the present concepts. The example environment 100 may include a cloud computing network 102 (e.g., network), a first user device 104, a second user device 106, and a third user device 108. Parentheticals are utilized after a reference number to distinguish like elements. Use of the reference number without the associated parenthetical is generic to the element. Additionally, although the example of FIG. 1 illustrates the first user device 104 and the second user device 106 as including desktop computers, as well as the third user device 108 including a mobile phone, in other examples, the first user device 104, the second user device 106, and the third user device 108 may include any other type of device.

In some examples, the environment 100 comprises a data center or cloud-computing network comprising servers and other network components (e.g., routers, switches, etc.) stored across multiple data centers located across geographic areas. In these instances, the cloud-computing environment may be a distributed network through which devices interact with service provided by the cloud computing network. The cloud computing network may provide on-demand availability of computing system resources, such as data storage, computing power (e.g., CPU, GPU, etc.), networking, databases, etc., without direct active management by users. In some examples, the cloud computing network may be managed and maintained by a service provider such that users do not have to invest in and maintain the computing infrastructure for their computing resource needs.

The first user device 104, the second user device 106, and/or the third user device 108 may be communicatively coupled among one another and/or to various other devices via cloud computing network 102. Within the example environment 100, the first user device 104, the second user device 106, and/or the third user device 108, and/or other devices, may exchange communications (e.g., packets) via a network connection(s) to the electronic device(s) 110 of the cloud computing network 102, indicated by double arrows 112. For instance, network connections 112 may be transport control protocol (TCP) network connections or any network connection (e.g., information-centric networking (ICN)) that enables the devices to exchange packets with other devices via the cloud computing network 102. The network connections 112 represent, for example, a data path between each of the first user device 104, the second user device 106, and/or the third user device 108 and the electronic device(s) 110.

For example, the second user device 106 may be a computer, laptop, mobile device, tablet, etc., while the electronic device(s) 110 may be configured to provide data and/or network services, such as messaging and/or security services, to the second user device 106. The electronic device(s) 110 may or may not be a producer, a point of generation, and/or origination of the data. For instance, the data may originate elsewhere for the electronic device(s) 110 to be able to provide the data to the first user device 104, the second user device 106, and/or the third user device 108. Additionally, or alternatively, the data may pass through other network devices (e.g., router, switch) on a path between the electronic device(s) 110 and the first user device 104, the second user device 106, and/or the third user device 108. It should be appreciated that the term "network connection" may also be referred to as a "network path." The use of a cloud computing network in this example is not meant to be limiting. Other types of networks are contemplated in accordance with the emergency notification concepts described herein.

The electronic device(s) 110 may allow users to create user accounts for messaging, where the user accounts are represented by user account data 114. For example, the second user device 106 may initially receive, from a user, one or more inputs representing information for the user account. As described above, the information may include, but is not limited to, an identity of the user (e.g., name, username, etc.), contact information (e.g., phone numbers, email first address, home first addresses, business first address, etc.) for one or more contacts of the user, a password, and/or any other type of information. The electronic device(s) 110 may then receive data representing the information from the second user device 106 and use the information to create the user account. After creating the user account, the user may then use the second user device 106 to update the information associated with the user account.

At "Step 1," the electronic device(s) 110 may receive a message 116 from the first user device 104. For instance, the first user device 104 may receive, from a user, one or more inputs associated with creating the message 116. The first user device 104 may then generate the message 116 based on the one or more inputs. As shown, the message 116 may include at least content 118 and a first code 120. As described herein, content may include, but is not limited to, contact information associated with the sender, contact information associated with the receiver, text, image(s), video(s), graphic(s), link(s), attachment(s), and/or any other type of content that may be included in the message 116. Additionally, as described above, the first code 120 may include, but is not limited to, a first QR code, a first barcode, and/or any other type of code for which a first address may be embedded. After generating the message 116, the electronic device(s) 110 may receive the message 116 from the first user device 104.

At "Step 2," the electronic device(s) 110 may replace the first code 120 within the message 116 with a second code 122. For instance, the electronic device(s) 110 may include an analysis component 124 that is configured to analyze the message 116 in order to identify codes, such as the first code 120. In some examples, the analysis component 124 analyzes the message 116 using one or more computer vision and/or image analysis techniques in order to identify the codes. In some examples, the analysis component 124 is configured to analyze the body of the message 116 as well as the attachments that are included within the message 116 in order to identify codes. Once the analysis component 124 identifies the first code 120 within the message 116, the electronic device(s) 110 may then use an address component 126 to analyze the first address embedded within the first code 120.

For example, the address component 126 may analyze the first address using one or more techniques in order to determine if the first address is a good address, a suspicious address, a malicious address, and/or any other type of address. In some examples, the address component 126 may analyze the first address using a reputation check to determine the type of address. For example, the address component 126 may compare the first address to a database of malicious addresses (e.g., a database of malicious URLs) to determine if the first address includes one of the malicious addresses included in the database. If the address component 126 determines that the first address is one of the malicious addresses, then the address component 126 may determine that the first address includes a malicious address.

Additionally, or alternatively, in some examples, the address component 126 may determine a risk score associated with the first address and then use the risk score to determine the type of address. For example, the address component 126 may use information about the message 116 and/or the first address to determine the score. As described above, the information may include, but is not limited to, a date/time the message 116 was sent, the contact information associated with the sender, the contact information associated with the receiver, a number of recipients that are receiving the message 116, whether the message 116 was routed through a known service provider, a format of the message 116 and/or data included in the message 116, a destination of the first address, a geolocation of where the first address originated, and/or any other information. Using the score, the address component 126 may then determine the type of address. For example, the address component 126 may determine that the first address is a good address when the score falls within a first range, the first address is a suspicious address when the score falls within a second range, the first address is a malicious address when the score falls when a third range, and/or so forth.

While these are just a couple example techniques of how the address component 126 may analyze the first address in order to determine the type of address, in other examples, the address component 126 may use one or more additional and/or alternative techniques.

The electronic device(s) 110 may then use a policy component 128 to determine whether to replace the first code 120 within the message 116. For example, the electronic device(s) 110 may store policy data 130 representing one or more policies. As described above, a policy may indicate to replace all codes within messages, replace codes within messages that includes specific types of addresses (e.g., suspicious addresses, malicious addresses, etc.), replace codes within messages that are directed to specific users (e.g., to manager of a business, to specific contact information), replace codes within messages that include addresses associated with specific types of network resource (e.g., sports websites, gambling websites, etc.), replace codes within messages that are sent from specific users (e.g., sent from specific email accounts), replace codes within messages that are directed to types of devices (e.g., computer, mobile phone, servers, etc.), replace codes within messages that are sent from types of devices, and/or any other policy. In some examples, the electronic device(s) 110 receive the policy data 130 from an electronic device, such as the second user device 106. For example, a user may use the second user device 106 to create the one or more policies for messages.

As such, the policy component 128 may then use the one or more policies to determine whether to replace the first code 120 within the message 116. For a first example, the electronic device(s) 110 may analyze the first address in order to determine whether the first address includes a good address, a suspicious address, a malicious address, and/or the like. If a policy indicates to replace codes within messages that include suspicious addresses or malicious addresses, then the policy component 128 may determine to replace the first code 120 within the message 116 when the first address includes the suspicious address or the malicious address. For a second example, the policy component 128 may analyze the message 116 in order to determine that the message 116 is directed to a specific user (e.g., directed to contact information, such as an email address, associated with the user). If a policy indicates to replace codes within messages that are directed to the user, then the policy component 128 may again determine to replace the first code 120 within the message 116.

If the policy component 128 determines to replace the first code 120 within the message 116, then the electronic device(s) 110 may use a code component 132 to generate the second code 122. For example, the code component 132 may initially generate a second address that is directed to a second network resource 134. The second network resource 134 may include a secure network resource, such as a secure proxy, a remote browser, a click time protection service, and/or one or more additional and/or alternative secure resources. In some examples, the second network resource 134 may include information about the first network resource. For example, the second network resource 134 may include the first address, an indication that the first network resource is suspicious and/or malicious, and/or any other type of information. After generating the second address, the code component 132 may then use the second address to generate the second code 122. For example, the code component 132 may generate the second code 122, such as a second QR code, such that the second address is embedded within the second code 122.

Figure 2:
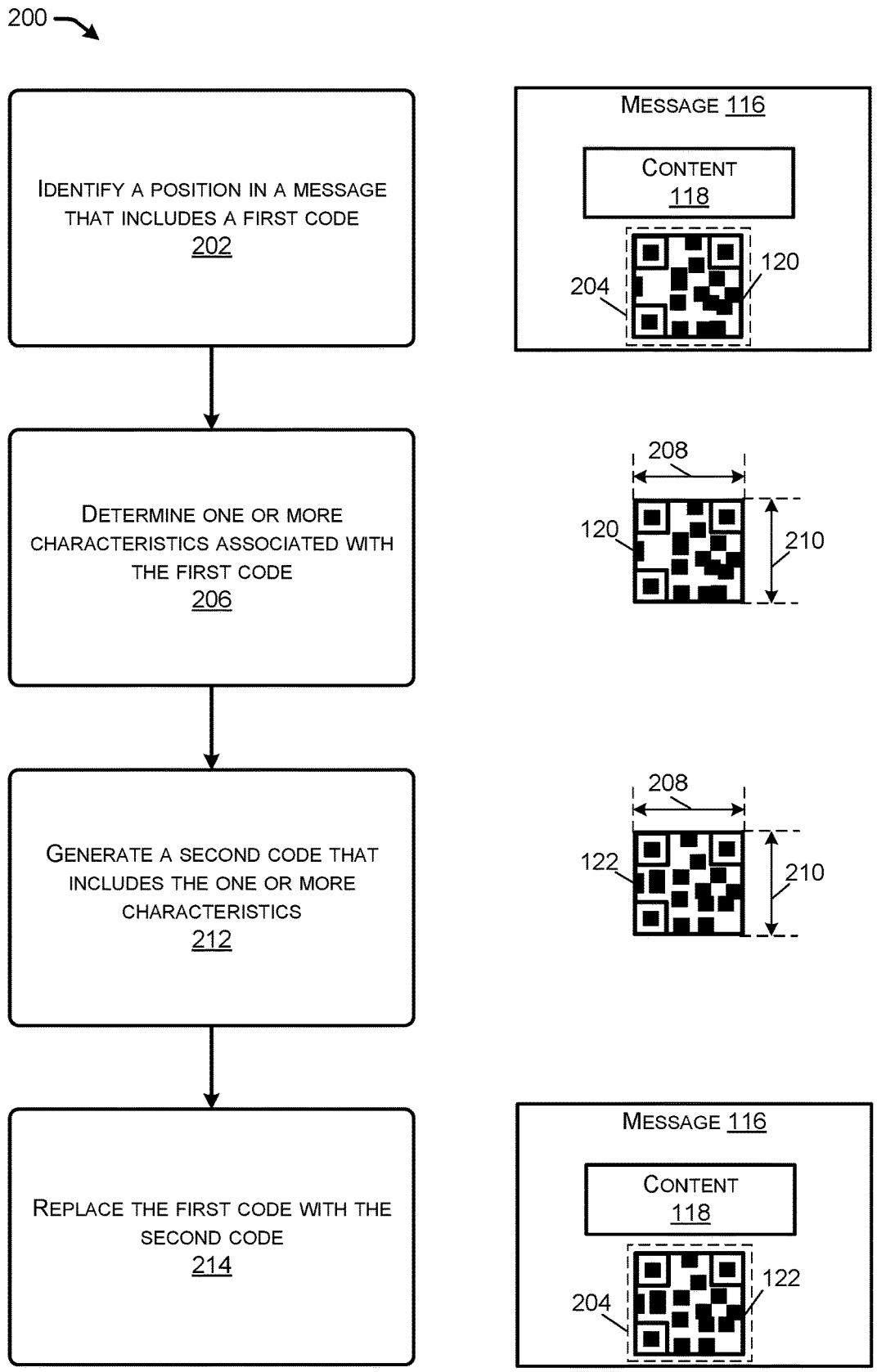
FIG. 2 illustrates a flow diagram of an example method for replacing a code within a message, in accordance with the present concepts.

The code component 132 may then replace the first code 120 with the second code 122 within the message 116. In some examples, and as illustrated by the example of FIG. 2, the code component 132 may use one or more characteristics associated with the first code 120 when replacing the first code 120 with the second code 122. For example, the code component 132 may determine the size of the first code 120 and/or the position of the first code 120 within the message 116. The code component 132 may then cause the second code 122 to include the size and/or be positioned at the position within the message 116. By performing such processes, the message 116 that now includes the second code 122 may look similar to the message 116 that originally included the first code 120 (except for the differences in the look of the second code 122 as compared to the first code 120).

At "Step 3," the electronic device(s) 110 may send the message 116 to the second user device 106. As shown, the second user device 106 may receive and then display the message 116, where the message 116 includes the second code 122. In some examples, the second user device 106 displays the message 116 based on receiving the message 116 (e.g., the second user device 106 displays the message 116 at a time of receiving the message 116). In other examples, the second user device 106 may not display the message 116 for a period of time after receiving the message 116. For example, the second user device 106 may not display the message 116 for an hour, a day, a week, a month, and/or any other period of time.

While displaying the message 116, and at "Step 4," the third user device 108 may capture an image of the second code 122. The third user device 108 may then analyze the second code 122 in order to retrieve the second address embedded within the second code 122. Additionally, and at "Step 5," the third user device 108 may use the second address to connect to the second network resource 134. In some examples, the third user device 108 may then receive an input indicating whether to be transferred to the first network resource. If the third user device 108 receives the input to transfer to the first network resource, then the third user device 108 may be provided with the first address to the first network resource. However, if the third user device 108 receives the input to not transfer to first network resource, then the third user device 108 may stay connected to the second network resource 134.

FIG. 2 illustrates a flow diagram of an example method 200 for replacing a code within a message, in accordance with the present concepts. An operation 202 represents identifying a position in a message that includes a first code. For instance, the electronic device(s) 110 may analyze the message 116 in order to identify the first code 120. The electronic device(s) 110 may then further analyze the message 116 in order to identify the position 204 of the first code 120 within the message 116. As described above, in some examples, the first code 120 may be included within an attachment of the message 116. In such examples, the electronic device(s) 110 may determine the position 204 of the first code 120 within the attachment.

An operation 206 represents determining one or more characteristics associated with the first code. For instance, the electronic device(s) 110 may analyze the first code 120 in order to determine the one or more characteristics. In the example of FIG. 2, the one or more characteristics include a first dimension 208 and a second dimension 210 associated with the first code 120. However, in other examples, electronic device(s) 110 may determine one or more additional and/or alternative characteristics. After determining the one or more characteristics, an operation 212 then represents generating a second code that includes the one or more characteristics. For instance, the electronic device(s) 110 may then generate the second code 122 that also includes the one or more characteristics. For example, and as shown, the second code 122 includes the same first dimension 208 and the same second dimensions 210 as the first code 120.

An operation 214 represents replacing the first code with the second code. For instance, the electronic device(s) 110 may then replace the first code 120 with the second code 122. As shown, the second code 122 is placed at the same position 204 within the message 116. As such, even though the electronic device(s) 110 replaced the first code 120 within the message 116 with the second code 122, the message 116 may appear to not have changed to a user.

Figure 3:
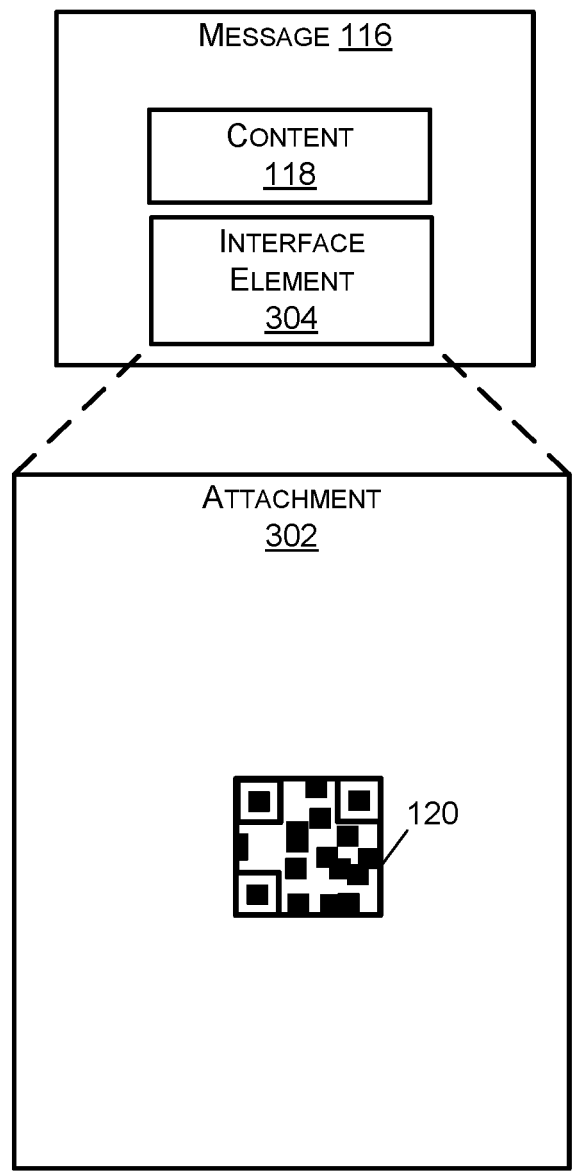
FIG. 3 illustrates an example of a code that is included within an attachment of a message, in accordance with the present concepts.

FIG. 3 illustrates an example of the first code 120 that is now included within an attachment 302 of the message 116, in accordance with the present concepts. As shown, the message 116 now includes an interface element 304 that is selectable in order to retrieve the attachment 302. The interface element 304 may include, but is not limited to, a button, a link, a graphic, a video, a document, and/or any other type of interface element 304 that is selectable for retrieving the attachment 302. As discussed above, the electronic device(s) 110 are able to analyze the message 116, identify the interface element 304, use the interface element 304 to retrieve the attachment 302, identify the first code 120 within the attachment 302, and then perform the processes described herein to replace the first code 120 with the second code 122.

Figure 4:
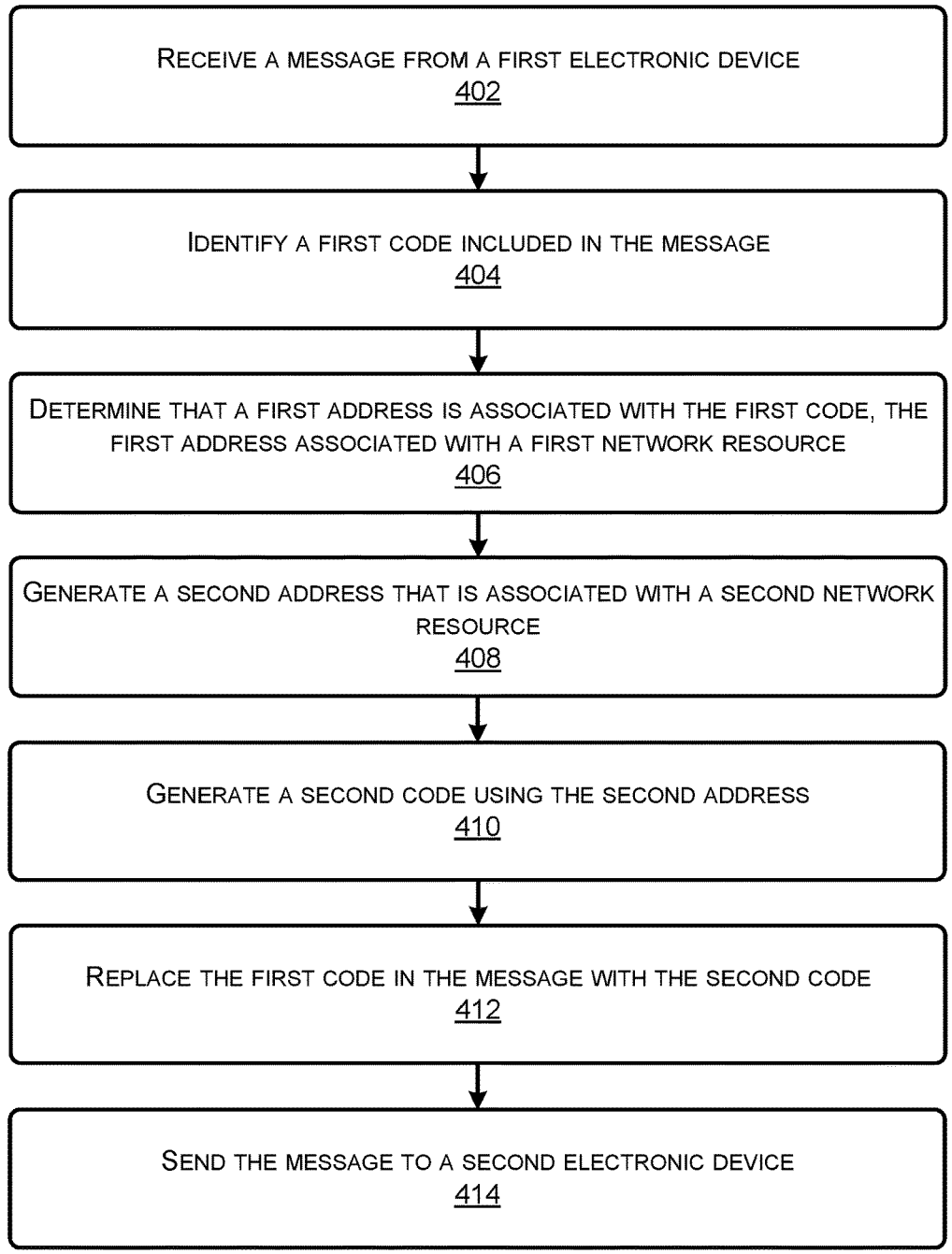
FIG. 4 illustrates a flow diagram of a first example method for replacing a first code in a message with a second code, in accordance with the present concepts.

FIG. 4 illustrates a flow diagram of a first example method 400 replacing a first code in a message with a second code, in accordance with the present concepts. An operation 402 represents receiving a message from a first electronic device. For instance, the electronic device(s) 110 may receive the message from the first electronic device (e.g., the first user device 104). In some examples, the message includes at least contact information for a sender, contact information for a receiver, content, and a first code. For example, if the message includes an email message, then the message may include at least a first email address of the sender, a second email address of the receiver, the content, and the first code.

An operation 404 represents identifying a first code included in the message. For instance, the electronic device(s) 110 may then analyze the message in order to identify the first code. In some examples, the electronic device(s) 110 analyze the message using one or more computer vision and/or image analysis techniques in order to identify the first code. For example, the electronic device(s) 110 may analyze the message using the one or more computer vision and/or image analysis techniques in order to identify a first QR code or first barcode included within the message. In some examples, the electronic device(s) 110 identify the first code as being included in an attachment of the message.

An operation 406 represents determining that a first address is associated with the first code, the first address associated with a first network resource. For instance, the electronic device(s) 110 may analyze the first code and based on the analysis, determine that the first address is embedded within the first code. The electronic device(s) 110 may then perform one or more of the processes described herein to determine whether the first network resource is good, suspicious, and/or malicious. Additionally, the electronic device(s) 110 may use one or more policies to determine whether to replace the first code within the message. For a first example, the electronic device(s) 110 may determine to replace the first code when the first network resource is suspicious and/or malicious. For a second example, the electronic device(s) may determine to replace the first code based on the recipient of the message.

An operation 408 represents generating a second address that is associated with a second network resource and an operation 410 represents generating a second code using the second address. For instance, the electronic device(s) 110 may generate the second address that is associated with the second network resource. As described above, the second network resource may include a secure proxy, a remote browser, a click-time protection service, and/or any other type of secure network resource. The electronic device(s) 110 may then generate the second code using the second address. For example, the electronic device(s) 110 may generate a second QR code and/or a second barcode, where the second address is embedded within the second QR code and/or the second barcode. In some examples, the electronic device(s) 110 generate the second code using one or more similar characteristics as the first code.

An operation 412 represents replacing the first code in the message with the second code and an operation 414 represents sending the message to a second electronic device. For instance, the electronic device(s) 110 may remove the first code from the message and then replace the first code with the second code. In some examples, the electronic device(s) 110 place the second code in the message at a same position for which the first code was located within the message. The electronic device(s) 110 may then send the message, with the second code, to the second electronic device (e.g., the second user device 106). In some examples, the electronic device(s) 110 send the message using the contact information for the receiver. For example, the electronic device(s) 110 may send the message to the email address for the receiver.

Figure 5:
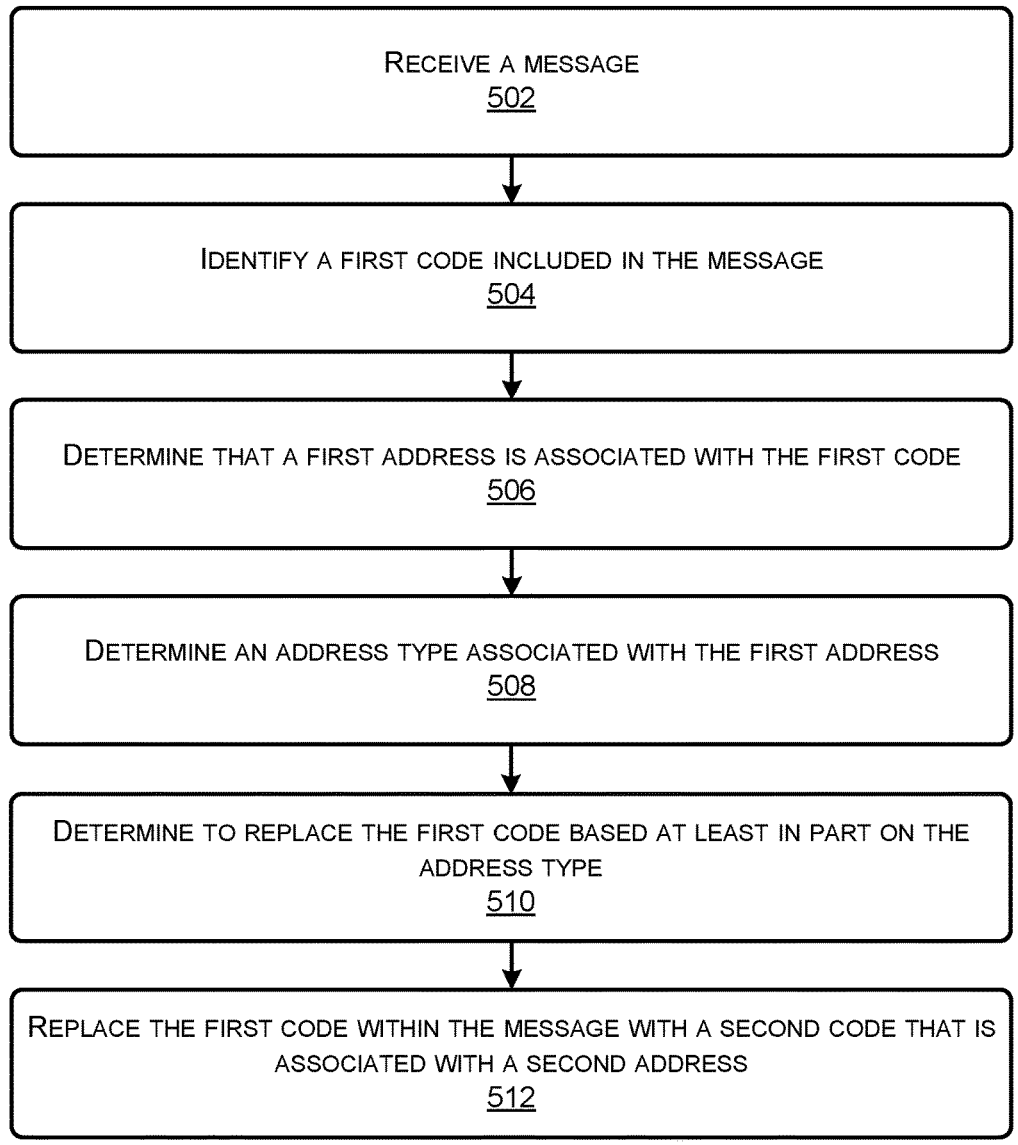
FIG. 5 illustrates a flow diagram of a second example method for replacing a first code in a message with a second code, in accordance with the present concepts.

FIG. 5 illustrates a flow diagram of a second example method 500 replacing a first code in a message with a second code, in accordance with the present concepts. An operation 502 represents receiving a message. For instance, the electronic device(s) 110 may receive the message from a first electronic device (e.g., the first user device 104) and/or a message provider (e.g., an email provider). In some examples, the message includes at least contact information for a sender, contact information for a receiver, content, and a first code. For example, if the message includes an email message, then the message may include at least a first email address of the sender, a second email address of the receiver, the content, and the first code.

An operation 504 represents identifying a first code included in the message. For instance, the electronic device(s) 110 may then analyze the message in order to identify the first code. In some examples, the electronic device(s) 110 analyze the message using one or more computer vision and/or image analysis techniques in order to identify the first code. For example, the electronic device(s) 110 may analyze the message using the one or more computer vision and/or image analysis techniques in order to identify a first QR code or first barcode included within the message. In some examples, the electronic device(s) 110 identify the first code as being included in an attachment of the message.

An operation 506 represents determining that a first address is associated with the first code and an operation 508 represents determining an address type associated with the first address. For instance, the electronic device(s) 110 may analyze the first code and based on the analysis, determine that the first address is embedded within the first code. The electronic device(s) 110 may then perform one or more of the processes described herein to determine the address type. For example, the electronic device(s) 110 may determine whether the first address is a good address, a suspicious address, a malicious address, and/or the like.

An operation 510 represents determining to replace the first code based at least in part on the address type. For instance, the electronic device(s) 110 may determine to replace the first code within the message based on the address type. In some examples, the electronic device(s) 110 may use one or more policies to determine whether to replace the first code within the message. For a first example, the electronic device(s) 110 may determine to replace the first code when the first address is suspicious and/or malicious. For a second example, the electronic device(s) may determine to replace the first code based on the recipient of the message.

An operation 512 represents replacing the first code within the message with a second code that is associated with a second address. For instance, the electronic device(s) 110 may replace the first code within the message with the second code. As described herein, the second code may be associated with the second address, where the second address is associated with a secure proxy, a remote browser, a click-time protection service, and/or any other type of secure network resource. The electronic device(s) 110 may then send the message to a second electronic device (e.g., the second user device 106) and/or the message provider (e.g., the email provider).

Figure 6:
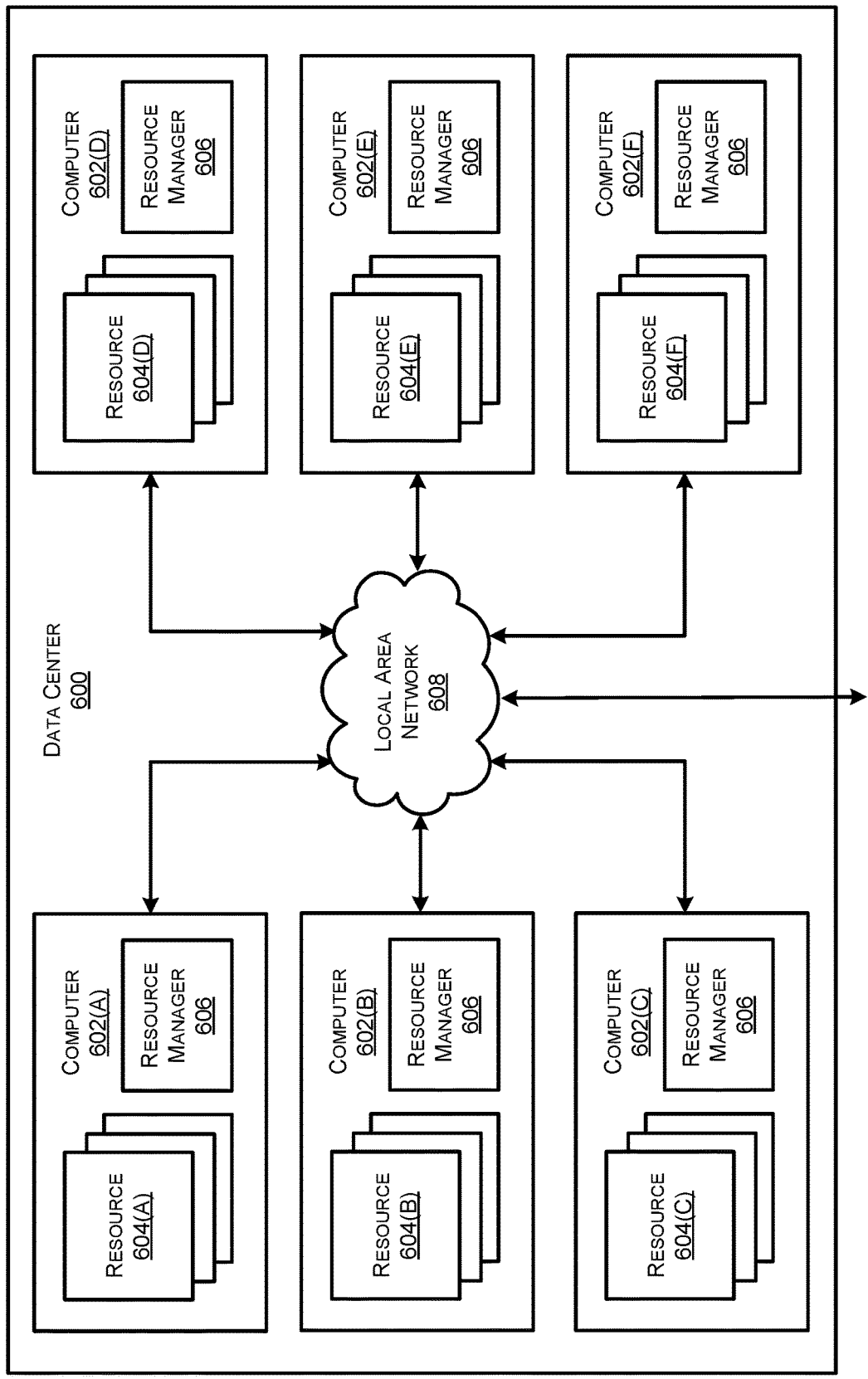
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several computers 602A-602F (which might be referred to herein singularly as "a computer 602" or in the plural as "the computers 602") for providing computing resources. In some examples, the resources and/or computers 602 may include, or correspond to, any type of networked device described herein, such as the electronic device(s) 110. Although, computers 602 may comprise any type of networked device, such as servers, switches, routers, hubs, bridges, gateways, modems, repeaters, access points, hosts, etc.

The computers 602 can be standard tower, rack-mount, or blade server computers configured appropriately for providing computing resources. In some examples, the computers 602 may provide computing resources 604 including data processing resources such as virtual machine (VM) instances or hardware computing systems, database clusters, computing clusters, storage clusters, data storage resources, database resources, networking resources, and others. Some of the computers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single computer 602. Computers 602 in the data center 600 can also be configured to provide network services and other types of services.

In the example data center 600 shown in FIG. 6, an appropriate local area network (LAN) 608 is also utilized to interconnect the computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the computers 602A-602F in each data center 600, and, potentially, between computing resources in each of the computers 602. It should be merely illustrative and that other implementations can be utilized.

In some examples, the computers 602 may each execute one or more application containers and/or virtual machines to perform techniques described herein. For instance, the containers and/or virtual machines may serve as server devices, user devices, and/or routers in the cloud computing network 102.

In some instances, the data center 600 may provide computing resources, like application containers, VM instances, and storage, on a permanent or an as-needed basis. Among other types of functionality, the computing resources provided by a cloud computing network may be utilized to implement the various services and techniques described above. The computing resources 604 provided by the cloud computing network can include various types of computing resources, such as data processing resources like application containers and VM instances, data storage resources, networking resources, data communication resources, network services, and the like.

Each type of computing resource 604 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 604 not mentioned specifically herein.

The computing resources 604 provided by a cloud computing network may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 7.

Figure 7:
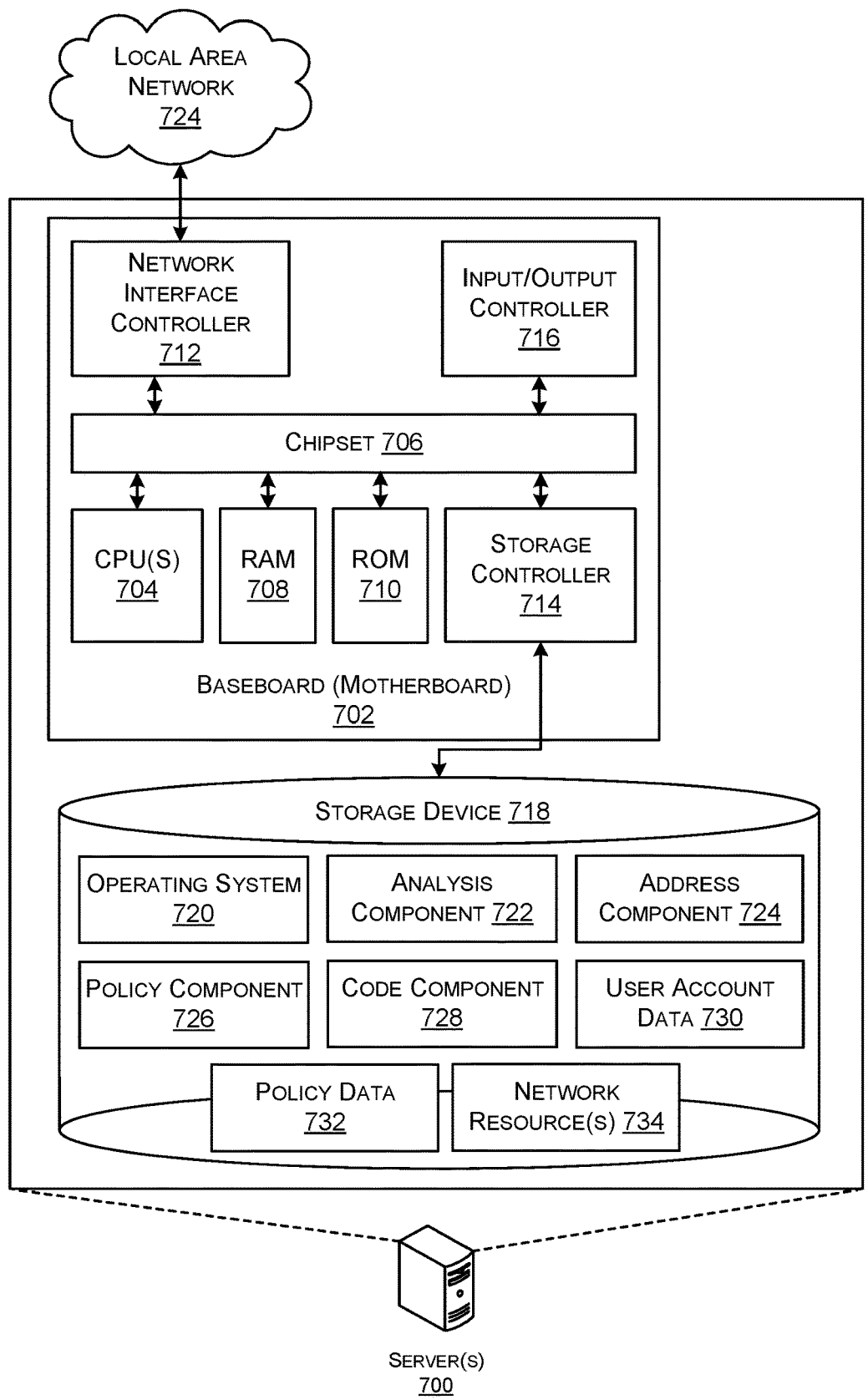
FIG. 7 is a computer architecture diagram showing an illustrative computer hardware architecture for implementing a server computing device that can be utilized to implement aspects of the various technologies presented herein.

FIG. 7 is a computer architecture diagram showing an illustrative computer hardware architecture for implementing a server computing device 700 that can be utilized to implement aspects of the various technologies presented herein. The electronic device(s) 110, discussed above, may include some or all of the components discussed below with reference to the server computing device 700.

To begin, the server computer 700 can be standard tower, rack-mount, or blade server computers configured appropriately for providing the computing resources described herein. As mentioned above, the computing resources provided by a cloud computing network, data center, or the like can be data processing resources such as VM instances or hardware computing systems, database clusters, computing clusters, storage clusters, data storage resources, database resources, networking resources, and others. Some of the servers 700 can also be configured to execute a resource manager capable of instantiating and/or managing the computing resources. In the case of VM instances, for example, the resource manager can be a hypervisor or another type of program configured to enable the execution of multiple VM instances on a single server computer 700. Server computers 700 in a data center can also be configured to provide network services and other types of services.

The server computer 700 includes a baseboard 702, or "motherboard," which is a printed circuit board to which a multitude of components or devices can be connected by way of a system bus or other electrical communication paths. In one illustrative configuration, one or more central processing units (CPUs) 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as a local area network 724. The chipset 706 can include functionality for providing network connectivity through a Network Interface Card (NIC) 712, such as a gigabit Ethernet adapter. The NIC 712 is capable of connecting the computer 700 to other computing devices over the network. It should be appreciated that multiple NICs 712 can be present in the computer 700, connecting the computer to other types of networks and remote computer systems.

The computer 700 can be connected to a storage device 718 that provides non-volatile storage for the computer. The storage device 718 can store an operating system 720 and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI (SAS) interface, a serial advanced technology attachment (SATA) interface, an FC interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by the computer 700, and or any components included therein, may be supported by one or more devices similar to computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 4 and 5. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

The server computer 700 may also store, in the storage device 718, an analysis component 722 (which may operate similar to the analysis component 124), an address component 724 (which may operate similar to the address component 126), a policy component 726 (which may operate similar to the policy component 128), a code component 728 (which may operate similar to the code component 132), user account data 730 (which may include, and/or be similar to, the user account data 114), policy data 732 (which may include, and/or be similar to, the policy data 130), and network resource(s) 734 (which may include, and/or be similar to, the network resource(s) 134).

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A system comprising:
one or more processors; and
one or more non-transitory computer-readable media storing instructions that, when executed by the one or more processors, cause the one or more processors to perform operations comprising:
receiving a message from a first electronic device;
analyzing the message in order to identify a first Quick Response (QR) code included in the message;
determining that a first address is embedded in the first (QR) code, the first address being associated with a first network resource;
generating a second address that is associated with a second network resource the second network resource being a trusted resource;
using the second address, generating a second QR code such that the second address is embedded in the second QR code;
determining, based at least in part on a policy, to replace the first QR code within the message;
replacing the first QR code within the message with the second QR code;
sending the message, which includes the second QR code, to a second electronic device, the second QR code being displayable by the second electronic device; and
storing data representing the policy, the policy indicating at least three of:
to replace QR codes included in messages;
to replace QR codes that represent addresses associated with a type of network resource;
to replace QR codes that are directed to a first user account;
to replace QR codes that are sent from a second user account;
to replace QR codes that are sent from a first device type; or
to replace QR codes that are directed to a second device type.

2. The system as recited in claim 1, wherein:
the message is an email;
determining that the first address is embedded in the first QR code comprises determining that a first Uniform Resource Locator (URL) is embedded in the first QR code; and
generating the second address that is associated with the second network resource comprises generating a second URL that is associated with the second network resource.

3. The system as recited in claim 1, the operations further comprising:
determining that the first network resource is at least one of a malicious resource or a suspicious resource; and
determining to replace the first QR code within the message based at least in part on the first network resource being the at least one of the malicious resource or the suspicious resource.

4. The system as recited in claim 1, the operations further comprising:
storing data representing the policy, the policy indicating:
to replace QR codes included in messages;
to replace QR codes that represent addresses associated with a type of network resource;
to replace QR codes that are directed to a first user account;
to replace QR codes that are sent from a second user account;
to replace QR codes that are sent from a first device type; and
to replace QR codes that are directed to a second device type; and
determining, based at least in part on the policy, to replace the first QR code within the message.

5. The system as recited in claim 1, wherein:
analyzing the message in order to identify the first QR code comprises at least:
analyzing the message to identify an attachment; and
determining that the attachment includes the first QR code; and
causing the first QR code within the message to be replaced with the second QR code comprises a least causing the first QR code in the attachment to be replaced with the second QR code.

6. The system as recited in claim 1, the operations further comprising:
determining one or more characteristics associated with the first QR code,
and wherein generating the second QR code is based at least in part on the one or more characteristics.

7. The system as recited in claim 1, wherein causing the first QR code within the message to be replaced with the second QR code comprises at least:
identifying a portion of the message that includes the first QR code;
causing the first QR code to be removed from the portion of the message; and
causing the second QR code to be placed at the portion of the message.

8. The system as recited in claim 1, wherein the second network resource includes at least one of:
a secure proxy;
a remote browser; or
a click-time protection service.

9. The system as recited in claim 1, wherein analyzing the message in order to identify the first QR code included in the message comprises at least:
analyzing the message using one or more computer-vision techniques; and
identifying the first code in the message based at least in part on the analyzing the message.

10. A method comprising:
receiving a message from a first electronic device;
identifying a first Quick Response (QR) code included in the message;
determining that a first address is represented by the first QR code, the first address being associated with a first network resource;
generating a second address that is associated with a second network resource, the second network resource being a trusted resource;
using the second address, generating a second QR code such that the second address is embedded in the second QR code;
determining, based at least in part on a policy, to replace the first QR code within the message;

replacing the first QR code within the message with the second QR code;
sending the message, which includes the second QR code, to a second electronic device, the second QR code being displayable by the second electronic device; and
storing data representing a policy, the policy indicating at least three of:
    to replace QR codes included in messages;
    to replace QR codes that represent addresses associated with a type of network resource;
    to replace QR codes that are directed to a first user account;
    to replace QR codes that are sent from a second user account;
    to replace QR codes that are sent from a first device type; or
    to replace QR codes that are directed to a second device type.

11. The method as recited in claim 10, wherein:
the message is an email;
determining that the first address is represented by the first QR code comprises determining that a first Uniform Resource Locator (URL) is embedded in the first code; and
generating the second address that is associated with the second network resource comprises generating a second URL that is associated with the second network resource.

12. The method as recited in claim 10, further comprising:
determining that the first network resource is at least one of a malicious resource or a suspicious resource; and
determining to replace the first QR code within the message based at least in part on the first network resource being the at least one of the malicious resource or the suspicious resource.

13. The method as recited in claim 10, further comprising:
storing different data representing the policy of indicating:
    to replace QR codes included in messages;
    to replace QR codes that represent addresses associated with a type of network resource;
    to replace QR codes that are directed to a first user account;
    to replace QR codes that are sent from a second user account;
    to replace QR codes that are sent from a first device type; and
    to replace QR codes that are directed to a second device type; and
determining, based at least in part on the policy, to replace the first code within the message.

14. The method as recited in claim 10, wherein:
identifying the first QR code comprises at least:
    analyzing the message to identify an attachment; and
    determining that the attachment includes the first QR code; and
causing the first QR code within the message to be replaced with the second QR code comprises a least causing the first QR code in the attachment to be replaced with the second QR code.

15. The method as recited in claim 10, further comprising:
determining one or more characteristics associated with the first QR code,
and wherein generating the second QR code that represents the second address is based at least in part on the one or more characteristics.

16. The method as recited in claim 10, wherein causing the first QR code within the message to be replaced with the second QR code comprises at least:
    identifying a portion of the message that includes the first QR code;
    causing the first QR code to be removed from the portion of the message; and
    causing the second QR code to be placed at the portion of the message.

17. The method as recited in claim 10, wherein generating the second address that is associated with the second network resource comprises at least generating the second address that is associated with at least one of:
    a secure proxy;
    a remote browser; or
    a click-time protection service.

18. One or more computing devices comprising:
one or more processors; and
one or more non-transitory computer-readable media storing instructions that, when executed by the one or more processors, cause the one or more processors to perform operations comprising:
    receiving a message associated with a first electronic device;
    determining that a portion of the message includes a first Quick Response (QR) code with a first embedded address;
    determining, based at least in part on a policy, to replace the first QR code within the message;
    causing the first QR code to be removed from the message;
    generating a second QR code with a second embedded address, the second address being associated with a trusted network resource;
    causing the second QR code to be included in the portion of the message;
    sending the message, with the second QR code, to a second electronic device, the second QR code being displayable by the second electronic device; and
    storing data representing the policy, the policy indicating at least three of:
        to replace QR codes included in messages;
        to replace QR codes that represent addresses associated with a type of network resource;
        to replace QR codes that are directed to a first user account;
        to replace QR codes that are sent from a second user account;
        to replace QR codes that are sent from a first device type; or
        to replace QR codes that are directed to a second device type.

19. The system as recited in claim 1, the operations further comprising:
    determining a risk score associated with the first address and then using the risk score to determine if the first address is at least one of a good address, a suspicious address, a malicious address, or a phishing address.

20. The system as recited in claim 19, the operations further comprising:
    using information about at least the first address for determining the risk score associated with the first address.

* * * * *